(12) United States Patent
Kanazawa et al.

(10) Patent No.: US 6,785,195 B1
(45) Date of Patent: Aug. 31, 2004

(54) AUTOMOTIVE AUDIO SYSTEM

(75) Inventors: Satoru Kanazawa, Tokyo (JP); Sadafumi Hamashima, Tokyo (JP)

(73) Assignee: Clarion Co., Ltd., Tokyo (JP)

( * ) Notice: Subject to any disclaimer, the term of this patent is extended or adjusted under 35 U.S.C. 154(b) by 0 days.

(21) Appl. No.: 09/515,852

(22) Filed: Feb. 29, 2000

(30) Foreign Application Priority Data

Mar. 1, 1999 (JP) .......................................... 11-053248

(51) Int. Cl.[7] .............................................. G11B 19/00
(52) U.S. Cl. ..................... 369/24.01; 369/21
(58) Field of Search ............................. 369/24.01, 19, 369/21, 1, 4, 53.22, 197; 360/72.2; 381/106, 104, 1, 103, 18; 386/105, 124, 104, 94; 704/201, 218, 214; 455/149; 380/203

(56) References Cited

U.S. PATENT DOCUMENTS

| | | | |
|---|---|---|---|
| 4,796,100 A | * 1/1989 | Sakaguchi | ................. 386/105 |
| 5,313,524 A | 5/1994 | Van Hulle et al. | |
| 5,465,240 A | * 11/1995 | Mankovitz | ..................... 369/1 |
| 5,586,193 A | * 12/1996 | Ichise et al. | ................ 381/106 |
| 5,617,331 A | * 4/1997 | Wakai et al. | ................. 725/76 |
| 5,953,429 A | * 9/1999 | Wakai et al. | ................. 381/77 |
| 5,983,087 A | * 11/1999 | Milne et al. | ................ 455/149 |

FOREIGN PATENT DOCUMENTS

| | | |
|---|---|---|
| EP | 0 779 622 A2 | 6/1997 |
| EP | 0 953 976 A1 | 11/1999 |

\* cited by examiner

*Primary Examiner*—Ali Neyzari
(74) *Attorney, Agent, or Firm*—McGinn & Gibb, PLLC

(57) ABSTRACT

An automotive audio system includes a first unit for acquiring a sound signal to be reproduced, a second unit for controlling the first unit by means of a control signal and also reproducing the supplied sound signal, and a bus for establishing communication between the first unit and the second unit. The control signal and the sound signal are transferred in digital format between the first unit and the second unit via the bus.

20 Claims, 8 Drawing Sheets

AUTOMOTIVE AUDIO SYSTEM

BACKGROUND OF THE INVENTION

The present invention relates to an improvement of technology for automotive audio systems. More particularly, the invention relates to the idea of allowing both audio data and a control signal for controlling an external device to be sent over a single common line.

Known in the art are automotive audio systems that are installed on automobiles and other vehicles to reproduce the sound recorded on compact disks (CDs) and other media. A typical automotive audio system consists of a main unit that performs various kinds of control such as selection of a sound source and volume control and an external device such as a CD changer which is connected to the main unit via a bus of the type used in computers.

In this configuration, communication for causing information such as a playback command to be transferred between the main unit and the external device is established via the bus to provide better compatibility for an automotive navigation system and a vehicular computer. When the sound from the external device is to be reproduced with a speaker or the like via the main unit in the prior art automotive audio system, the digital audio data read from a recording medium such as a CD in the external device must first be converted to an analog sound signal or the like before it is sent to the main unit.

FIG. 8 is a functional block diagram showing an exemplary configuration of a CD drive for playback of CDs which is an example of the external device in the conventional automotive audio system. In the illustrated case, a replay command sent from the main unit passes through a bus converter unit 10 and an interface unit 30 to be forwarded to a mechanism control CPU 40. In accordance with the control by the mechanism control CPU 40, a servo processor 50 controls various servo mechanisms including tracking servo, focus servo and spindle servo via a driver 60.

A signal read with an optical pickup is amplified with a RF amplifier 70 and fed back to the servo processor 50. The amplified signal is also sent to a signal processing unit 80, where it is divided into three 20 components, one of which is sent to a signal converter unit 20 and converted to an analog sound signal, which is then output to an analog audio output line. The other components are used for control purposes and sent to the mechanism control CPU 40 and a decoder 90.

When reproducing the sound sent from the external device in the system shown in FIG. 8, the conventional practice is to send from the main unit a command that requests one or more pieces of music at a time and also send the same command to the mechanism control CPU in the external device. To be more specific, when the sound from the external device need be reproduced, the main unit first makes a music replay command that requests one or more pieces of music at a time and sends it to the bus. Upon reception by the external device, the command is sent to the mechanism control CPU 40 via the bus converter unit 10 and the interface unit 30. In response to the single command requesting for music replay that has been sent to the mechanism control CPU 40, one or more pieces of music are reproduced.

In the prior art described above, if a flaw in the medium or some other phenomenon causes an error in the reading of data by the CD driver shown in FIG. 8, the error is corrected by the mechanism control CPU 40 and the mechanisms such as servo processor 50 that are controlled by the CPU (the mechanisms are hereunder collectively referred to as "playback means").

However, the prior art technology described above has had various problems. First, the line of a control signal sent from the main unit to control the external device must be provided as a separate and independent entity from the line of sending a sound signal from the external device to the main unit. This inevitably increases the complexity of the overall system configuration.

Second, the conversion of digital audio data to an analog sound signal in the external device requires dedicated means and processing but this introduces deterioration of sound quality compared to the case of transmitting analog sound signals as such.

Third, the main unit receives the sound signal in analog form and, without analog-to-digital conversion, equalizing and other digital processing steps cannot be performed by means of a digital signal processor (DSP) which means considerable difficulty is involved in processing the sound signal.

Another problem with the prior art is that if, during the playback of at least one piece of music in response to the above-described command in the external device, the main unit performs the operation of jumping to next music (commonly called "track-up") or getting back to the preceding music (commonly called "track-down"), a command for temporary stop of replay has to be sent from the main unit to the external device. This is simply because in music reproduction, a playback command that is sent from the main unit to the external device requests for one or more pieces of music to be reproduced; after stopping the playback of music by sending the above-described command for playback stop, a command requesting for replay from the desired location must be sent but then the processing scheme becomes complex.

Sending a replay command that requests for reproduction of one or more pieces of music from the main unit to the external device presents a further problem. If an error such as interruption of data occurs in the playback means in the external device due, for example, to a flaw in the medium (i.e., disk) or its vibration, the error is difficult to correct and considerable difficulty is involved in securing the operational stability of the system.

If the error in the reading of data that has occurred due to a flaw in the medium or by some other reason is to be corrected solely by the replay means, it is difficult for the interface unit, the bus converter unit and the main unit to recognize the error information and perform the corresponding necessary operations, potentially causing a problem in the smooth processing by the system.

SUMMARY OF THE INVENTION

The present invention has been accomplished under these circumstances of the prior art and has as an object providing an automotive audio system in which the audio data from an external device is sent to a main unit as it remains in digital form, whereby both audio data and a control signal for controlling the external device are sent over a single common line to simplify the overall system configuration, prevent deterioration of sound quality and facilitating the processing of audio data in the main unit.

Another object of the invention is to provide an automotive audio system in which a command for music replay from the main unit is resolved at equal time intervals in the external device and the resulting small segments of the command are sent to the replay means, thereby increasing the efficiency and stability of the processing in the system.

Yet another object of the invention is to provide an automotive audio system in which an error in the reading of data is corrected in a bus converter unit, whereby the occurrence of the error and the contents of its correction can be recognized in the bus converter unit and the main unit so as to facilitate diverse error correction and stable system operation.

The first object of the invention can be attained by the automotive audio system recited in aspect 1, which comprises a first unit for acquiring a sound signal to be reproduced, a second unit for controlling the first unit by means of a control signal and also reproducing the supplied sound signal, and a bus for establishing communication between the first unit and the second unit, characterized in that the automotive audio system is adapted to transfer the control signal and the sound signal in digital format between the first unit and the second unit via the bus.

The invention recited in aspect 5 is equivalent to the invention of aspect 1, provided that it is expressed as a method of controlling an automotive audio system which comprises the steps of acquiring a sound signal to be reproduced by a first unit, controlling the first unit by means of a control signal and also reproducing the supplied sound signal by a second unit, and establishing communication between the first unit and the second unit by a bus, further comprising the step of transferring the control signal and the sound signal in digital format between the first unit and the second unit via the bus.

The invention recited in aspect 2 is a modification of the automotive audio system of aspect 1 and characterized in that the first unit comprises a bus converter means for controlling the transfer of signals via the bus and a control means for transferring the sound signal via the bus.

The invention recited in aspect 6 is equivalent to the invention of aspect 2, provided that it is expressed as a method of controlling an automotive audio system which is a modification of the invention recited in aspect 5, which further includes the steps of controlling the transfer of signals via the bus in the first unit and transferring the sound signal via the bus in the first unit.

According to the inventions of aspects 1, 5, 2 and 6, the line over which a sound signal is sent from the first unit exemplified by an external device such as a CD changer to the second unit such as a main unit and the line for sending a control signal from the second unit to the first unit can be realized as a single common bus. Namely, the sound signal is transferred from the external device to the main unit as it remains in a digital format. Not only does this obviate the use of two different signal sending lines but the external device also has no need to have a capability by which a digital format of sound signal read from a CD or other medium is converted to an analog format and, as a result, the overall system configuration is simplified. In addition, there is no deterioration in the quality of sound to be reproduced and the processing of the sound signal in the main unit can be facilitated.

The second object of the invention can be attained by the invention of aspect 3 which is a modification of the automotive audio system recited in aspect 1 or 2, wherein the first unit has a playback means for reading a sound signal from a recording medium and the bus converter means has a command resolving means by which a command for reading a predetermined volume of sound signal from a designated address on the recording medium is sent to the playback means at predetermined time intervals in accordance with the contents of the control signal being supplied.

The invention of aspect 7 is equivalent to the invention of aspect 3, provided that it is expressed as a method of controlling an automotive audio system which is a modification of the invention recited in aspect 5 or 6, wherein the first unit has a playback means for reading a sound signal from a recording medium and which further includes a step in which a command for reading a predetermined volume of sound signal from a designated address on the recording medium is sent to the playback means at predetermined time intervals in accordance with the contents of the control signal being supplied.

In the inventions of aspects 3 and 7, when a playback start command is sent from the second unit, the first unit does not forward the supplied command but a command instructing reproduction of each specified block is sent to the playback means at given time intervals. Thus, the second unit has no need to send a stop command to the first unit even if the operation of track-up or track-down is performed during playback. To be more specific, the first unit which has received a signal such as one for track-up needs only to supply the playback means with a command requesting for replay from a re-designated start address. As a result, the processing for the second unit to control the first unit can be performed with increased efficiency.

Even in the case where the second unit performs the operation of stopping playback and a signal to that effect is sent to the first unit, the latter does not have to send another command for playback stop to the replay means but it needs only to stop sending the command requesting for replay. Thus, control procedures such as starting replay, re-designating a start address and stopping replay are all taken within the first unit and any errors that occur in the replay means due, for example, to a flaw in the medium and its vibration can be easily corrected to increase the operational stability of the system.

The third object of the invention can be attained by the invention of aspect 4 which is a modification of the automotive audio system recited in any one of aspects 1 to 3, wherein the bus converter means has a means for correcting any error that occurs in the reading of the sound signal.

The invention of aspect 8 is equivalent to the invention of aspect 4, provided that it is expressed as a method of controlling an automotive audio system which is a modification of the invention recited in any one of aspects 5 to 7, which further includes the step of correcting any error that occurs in the reading of the sound signal in the second unit.

According to the inventions of aspects 4 and 8, errors are corrected by the bus converter means and other relevant components of the second unit; therefore, even if an error in the reading of sound signal occurs due, for example, to a flaw in the medium or its vibration, relevant information such as the occurrence of the flaw and the contents of its correction can be recognized in the bus converter means and the main unit. As a result, error correction can be performed in diverse ways by various components of the system and its operational stability is improved, leading to particularly great benefits when successive errors occur. If the configuration according to aspects 4 and 8 is combined with the command resolving means and step recited in aspects 3 and 7, the second unit needs only to send a control signal such as one for replay start or track-up to the first unit, which then executes the necessary steps including designation of a new start address and error correction; as a result, the burden on the second unit is reduced.

DETAILED DESCRIPTION OF THE PREFERRED EMBODIMENTS

Embodiments of the present invention as it relates to an automotive audio system and a method of controlling it are described below specifically with reference to accompanying drawings. To implement the following embodiments of the invention, various specific configurations can be contemplated for the circuit and its constituent elements such as a microcomputer; therefore, the invention and its preferred embodiments are described below by means of a virtual circuit block that can implement individual functions encompassed by the invention and its embodiments.

1. First Embodiment 1-1. Configuration

Figure 1:
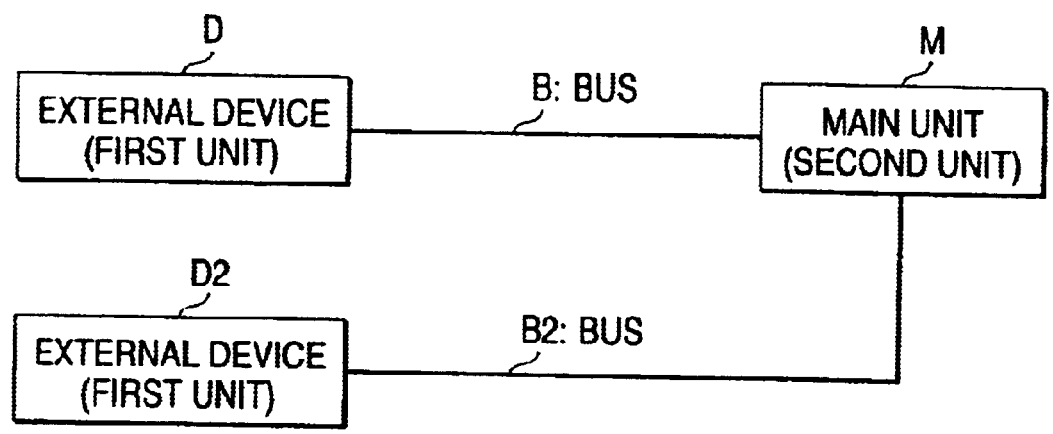
FIG. 1 is a functional block diagram showing the general configuration of an automotive audio system according to the first embodiment of the invention.

FIG. 1 shows the first embodiment of the invention which is an automotive audio system consisting of an external device D and a main unit M that are connected by a bus B. The external device D is a first unit for acquiring a sound signal to be reproduced. The main unit M is a second unit for controlling the external device D by means of a control signal and also reproducing the supplied sound signal.

The bus B is for establishing communication between the external device D and the main unit M. An external device D2 and a bus B2 may additionally be connected to the main unit M. The automotive audio system according to the first embodiment is adapted to transfer the control signal and the sound signal in digital format between the external device D and the main unit M via bus B. In the present invention, the sound signal in a digital format is especially referred to as "audio data".

To be more specific about the first embodiment, a bus converter unit in the external device D which is used to control signal transfer via the bus B has a control means added thereto for controlling the transfer of sound signal and this enables the transmission of a digital sound signal to the bus B.

Figure 2:
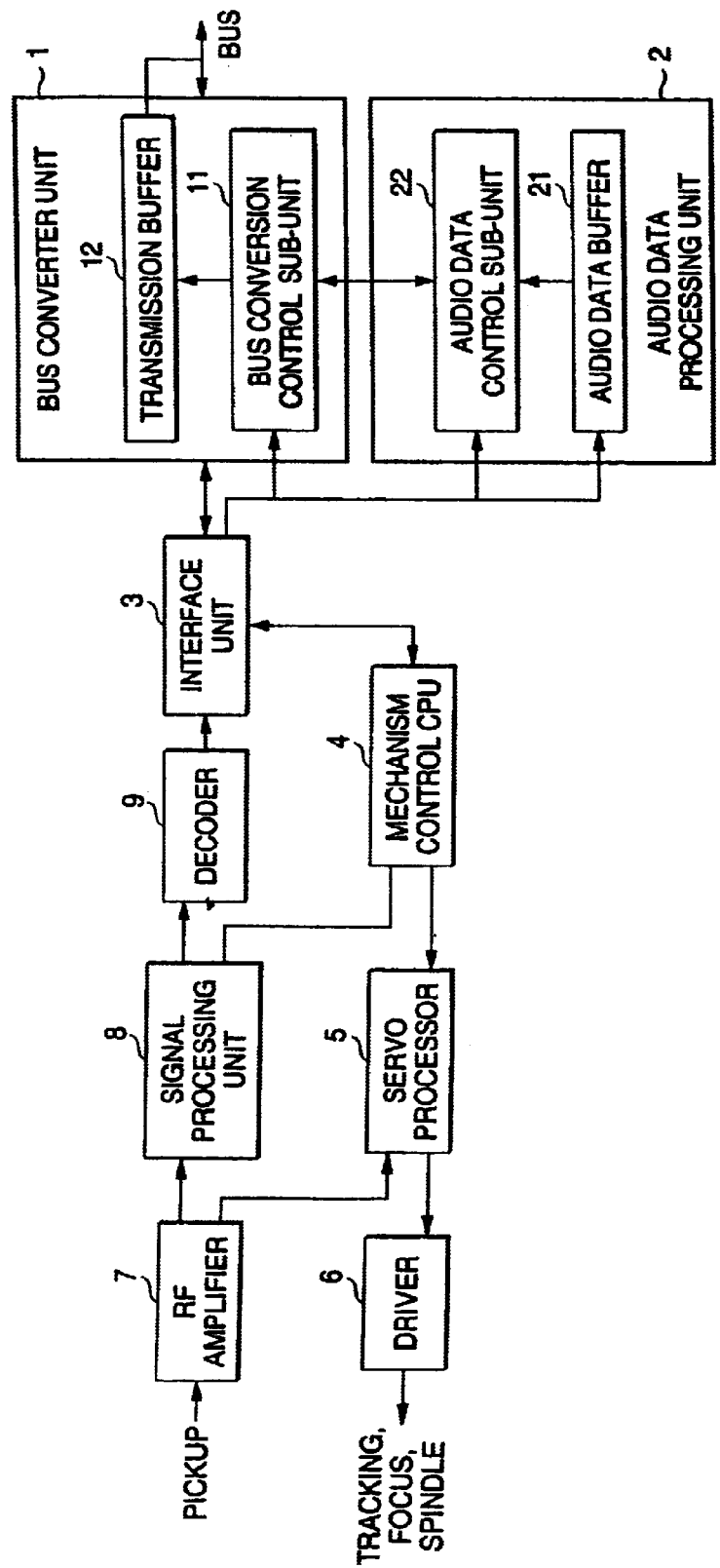
FIG. 2 is a functional block diagram showing the specific configuration of the external device in the first embodiment of the invention.

FIG. 2 is a functional block diagram showing the specific configuration of the external device D in the first embodiment. As shown, the external device D comprises a bus converter unit 1, an audio data processing unit 2, an interface unit 3, a mechanism control CPU 4, a servo processor 5, a driver 6, a RF amplifier 7, a signal processing unit 8 and a decoder 9.

The interface unit 3 is an I/O control circuit by means of which data is input to the external device D and output therefrom. The mechanism control CPU 4 is for controlling hardware mechanisms (not shown). The mechanism control CPU 4 and the hardware mechanisms combine to form a replay means for reading a sound signal from a recording medium. Although not shown, exemplary mechanisms include a disk loading mechanism, an optical pickup and the associated feed mechanism, spindle motors and control circuits therefor, and various sensors.

The driver 6 is a means of controlling mechanisms such as a thread motor (not shown) for the optical pickup, as well as spindle motors for a tracking actuator, a focus coil and a turntable. The servo processor 5 is a means by which the functions of servo mechanisms such as a tracking servo, a focus servo and a spindle servo are realized via the driver 6.

The RF amplifier 7 is a means of amplifying a bit patterned signal the optical pickup has read from the recording medium such as a CD. The output from the RF amplifier 7 is not only sent to the signal processing unit 8 but also fed back to the servo processor 5. The signal processing unit 8 is a means by which the amplified signal is converted to a predetermined format by a processing step such as clipping before it is transferred to the mechanism control CPU 4 and the decoder 9. The decoder 9 is a means by which the signal received from the signal processing unit 8 is converted to digital audio data in a predetermined format.

The bus converter unit 1 is a bus converter means for controlling signal transfer via the bus B and, specifically, it comprises a bus conversion control sub-unit 11 and a transmission buffer 12. The bus conversion control sub-unit 11 is a means by which voltage transforming, packet control and other steps are performed between the interface unit 3 and the bus B. The transmission buffer 12 is a means by which the timing on which a transmission signal is received from the interface unit 3 and the audio data processing unit 2 is matched with the timing of data transfer over the bus B; the transmission buffer 12 is typically a FIFO buffer.

The audio data processing unit 2 is a control means for transferring audio data via the bus B and, specifically, it comprises an audio data buffer 21 and an audio data control sub-unit 22. The audio data buffer 21 is a means by which the timing on which audio data is received from the interface unit 3 is matched with the timing on which the bus converter unit 1 sends out audio data to the bus B; the audio data buffer 21 is typically a FIFO buffer. The audio data control sub-unit 22 is a means of controlling the transfer of audio data to the bus converter unit 1 in such a way that a predetermined pace of data transfer and other conditions are satisfied.

1-2. Operation

Having the configuration described above, the automotive audio system according to the first embodiment of the invention is operated in the following manner.

1-2-1. General Operation

In the first embodiment of the invention, a replay command from the main unit M is first sent to the mechanism control CPU 4 via the bus converter unit 1 and the interface unit 3. In accordance with the control by the mechanism control CPU 4, the servo processor 5 controls various servo mechanisms including tracking servo, focus servo and spindle servo via the driver 6.

A signal read with an optical pickup is amplified with the RF amplifier 7 and fed back to the servo processor 5. The amplified signal is also sent to the signal processing unit 8, where it is converted to a predetermined format and thence transferred for control purposes to the mechanism control CPU 4. The converted signal is also sent to the decoder 9, where it is further converted to a specified format of digital audio data and thence transferred to the audio data processing unit 2 via the interface unit 3.

In the audio data processing unit 2, the audio data is sent to the bus converter unit 1 in response to a request from the main unit M that conforms to a predetermined pace of data transfer. The bus converter unit 1 sends the audio data to the main unit M over the bus B; it also performs transfer of other signals as received from the interface unit 3.

1-2-2. Sequence of Steps in Transmission of Audio Data

Figure 3:
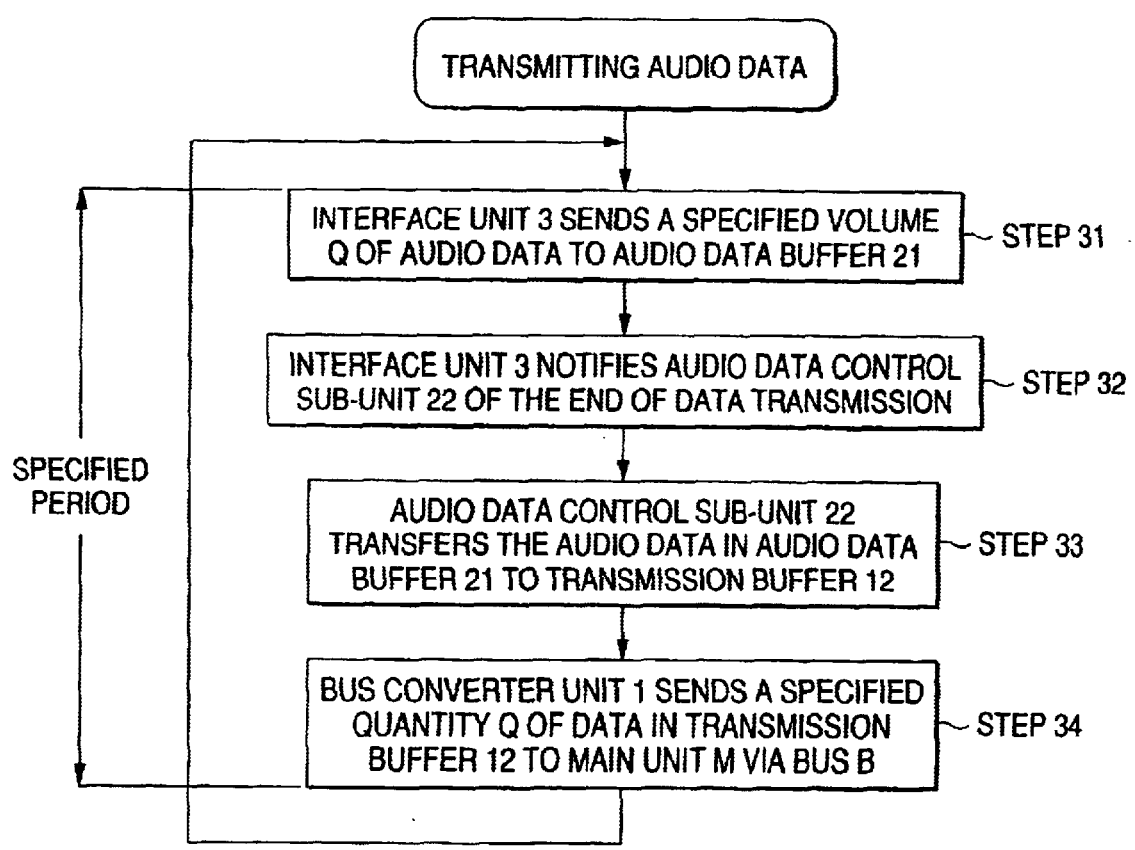
FIG. 3 is a flow chart showing the sequence of steps in transmitting audio data in the first embodiment of the invention.

We now describe more specifically the sequence of steps in transmission of audio data in the first embodiment. FIG. 3 is a flow chart showing the sequence of such steps in the first embodiment. The sequence starts with transmission of a specified volume Q of audio data to the audio data buffer 21 by the interface unit 3 at a specified period T (step 31). When transmission of the specified volume Q of audio data ends, the interface unit 3 notifies the audio data control sub-unit 22 of the end of audio data transmission (step 32).

Then, the audio data control sub-unit 22 transfers the data in the audio data buffer 21 to the transmission buffer 12 (step 33). Subsequently, the specified volume Q of audio data stored in the transmission buffer 12 is sent by the bus converter unit 1 to the main unit M via the bus B in response to a request being sent from the main unit M at a specified period T (step 34). This control sequence enables transmission of digital audio data over the bus B.

1-3. Advantages

Thus, in the first embodiment of the invention, the line over which audio data is sent from the external device D to the main unit M and the line for sending a control signal from the main unit M to the external device D can be realized as a single common bus B. As a result, the audio data is transferred from the external device D to the main unit M as it remains in a digital format. Not only does this obviate the use of two different data sending lines but the external device D also has no need to have a capability by which a digital format of sound signal read from a CD or other medium is converted to an analog format and, hence, the overall system configuration is simplified. In addition, there is no deterioration in the quality of sound to be reproduced and digital processing of the audio data in the main unit M using a DSP or other techniques can be accomplished with ease.

2. Second Embodiment

Figure 4:
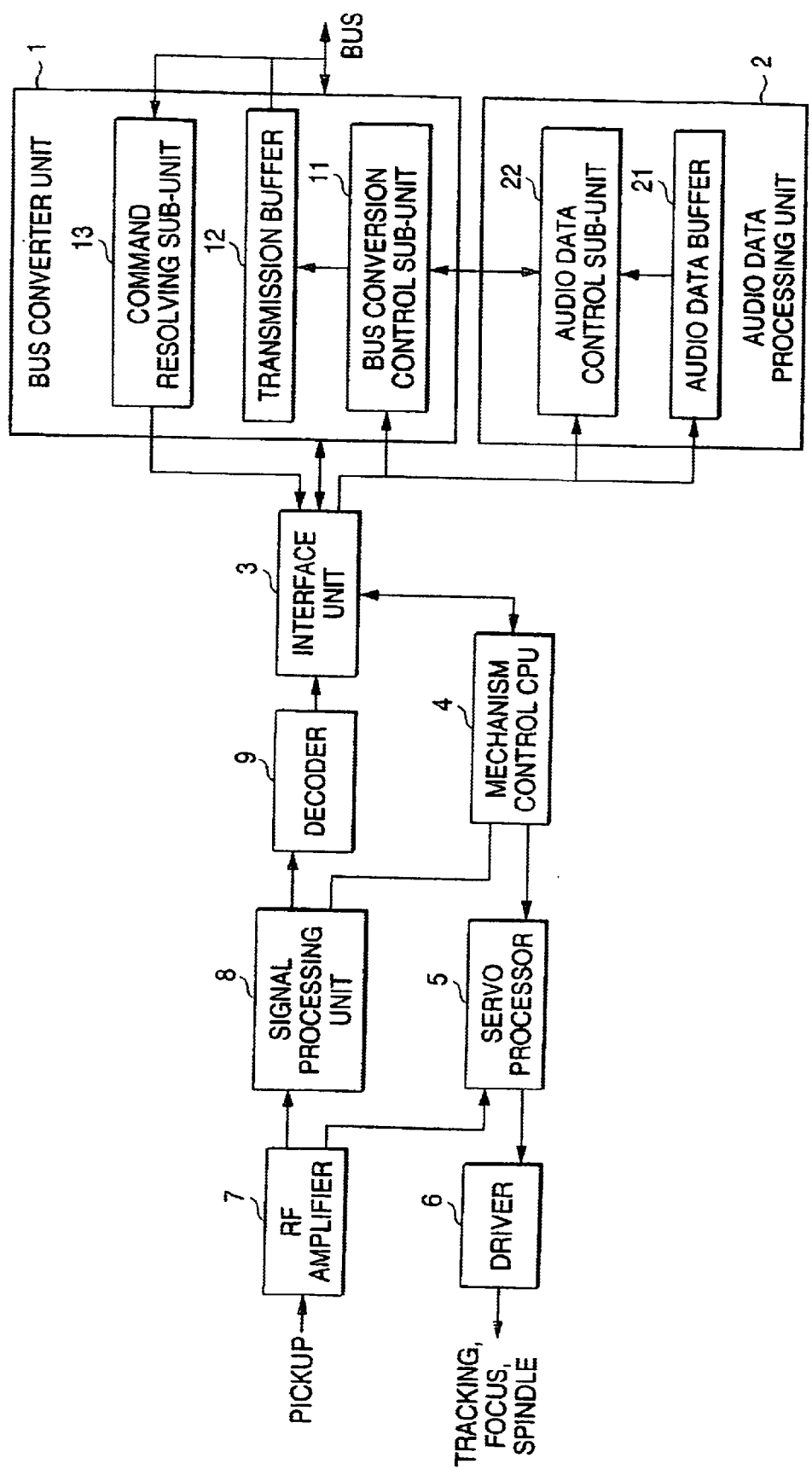
FIG. 4 is a functional block diagram showing the general configuration of an automotive audio system according to the second embodiment of the invention.

The second embodiment of the invention is essentially the same as the first invention, except that a command resolving sub-unit 13 is added to the bus converter unit 1 as shown in FIG. 4 so that a command requesting for playback of music is resolved at equal time intervals and the resulting segments of the command are transmitted to the mechanism control CPU 4. By the term "resolving" as used herein is meant a technique by which the command sent as a control signal from the main unit M is replaced with a plurality of commands which, taken as a whole, represent the same value as the supplied command.

In short, the command resolving sub-unit 13 is a means by which a command for reading a predetermined volume of sound signal from a designated address on the recording medium can be sent to the playback means at predetermined time intervals in accordance with the contents of the control signal being supplied.

In the second embodiment under consideration, upon receiving the replay start command from the main unit M, the command resolving sub-unit 13 in the external device D starts supplying the mechanism control CPU 4 with a command that instructs reproduction of each specified block at given time intervals.

Figure 5:
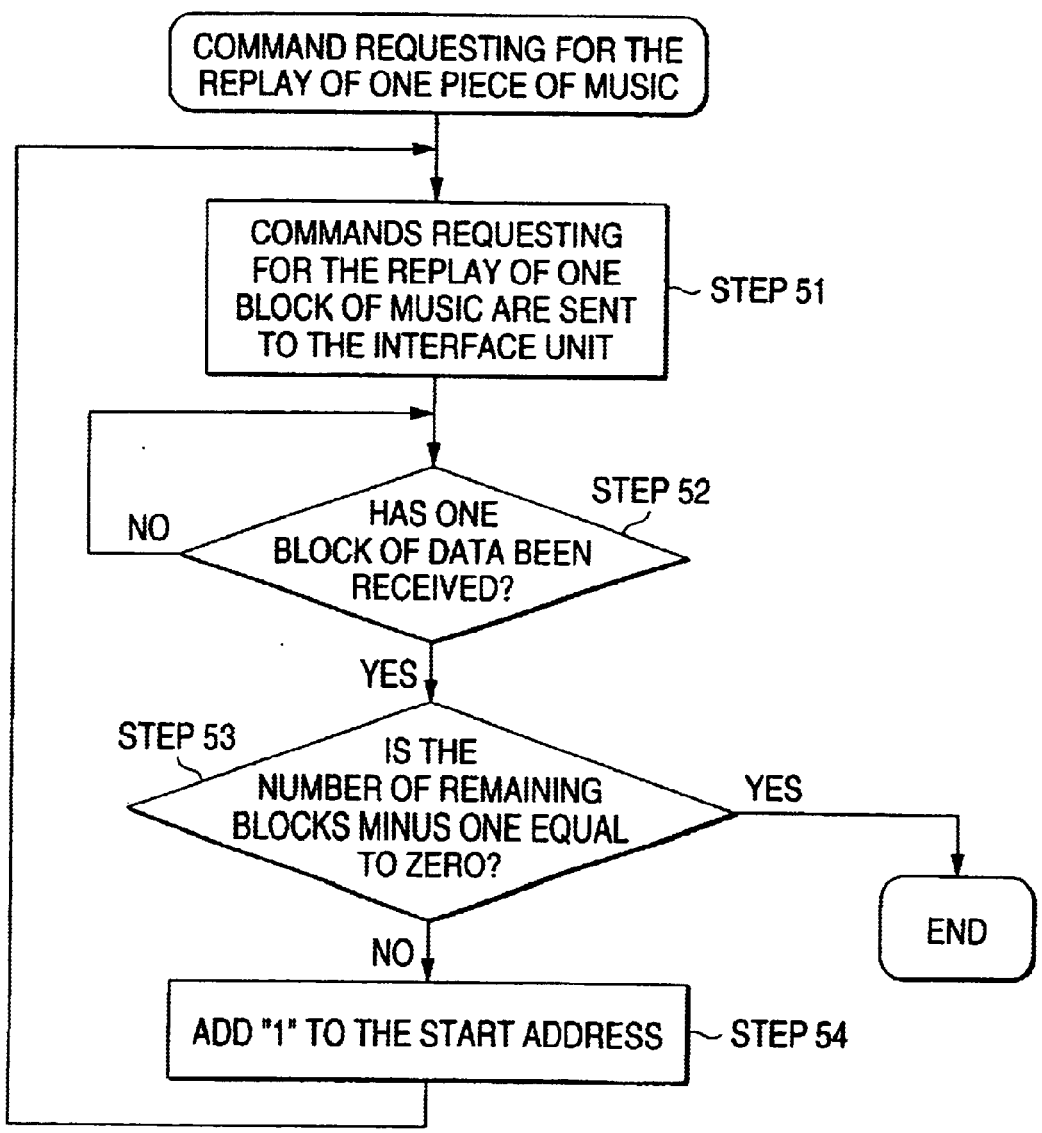
FIG. 5 is a flow chart showing the sequence of steps in processing in the second embodiment of the invention.

FIG. 5 is a flow chart showing the sequence of steps in an operation using the command resolving sub-unit 13. Upon receiving a command requesting for reproduction of one piece (X blocks) of music from the main unit M, the command resolving sub-unit 13 converts it to a plurality of commands requesting for the replay of one block of music and sequentially transmits the individual commands to the interface unit 3 (step 51).

Thereafter, the command resolving sub-unit 13 is notified by the audio data processing sub-unit 22 of the receipt of one block of audio data (step 52) and subtracts "1" from the number of remaining blocks. If the result is not zero (step 53), the address at which reading starts (called "start address") is increased by "1" (step 54) and the step of transmitting a command requesting for replay of the next one block of music is repeated (step 51). These steps are repeated until the number of remaining blocks becomes zero (step 53).

In the second embodiment described above, the main unit M has no need to send a stop command to the external device D even if the operation of track-up or track-down is performed during playback. To be more specific, the external device D which has received a signal such as one for track-up only requires that the command resolving sub-unit 13 supplies the mechanical control CPU 4 with a command requesting for replay from a re-designated start address in order to execute the necessary processing such as track-up. As a result, the processing for the main unit M to control the external device D can be performed with increased efficiency.

Even in the case where the main unit M performs the operation of stopping playback and a signal to that effect is sent to the external device D, the latter does not have to send another command for playback stop to the mechanism control CPU 4 but it needs only to stop sending the command requesting for replay. Thus, in the second embodiment, control procedures such as starting replay, re-designating a start address and stopping replay are all taken within the external device D and any errors that occur in the mechanism control CPU 4 and subsequent replay means due, for example, to a flaw in the medium and its vibration can be easily corrected to increase the operational stability of the system.

3. Third Embodiment

Figure 6:
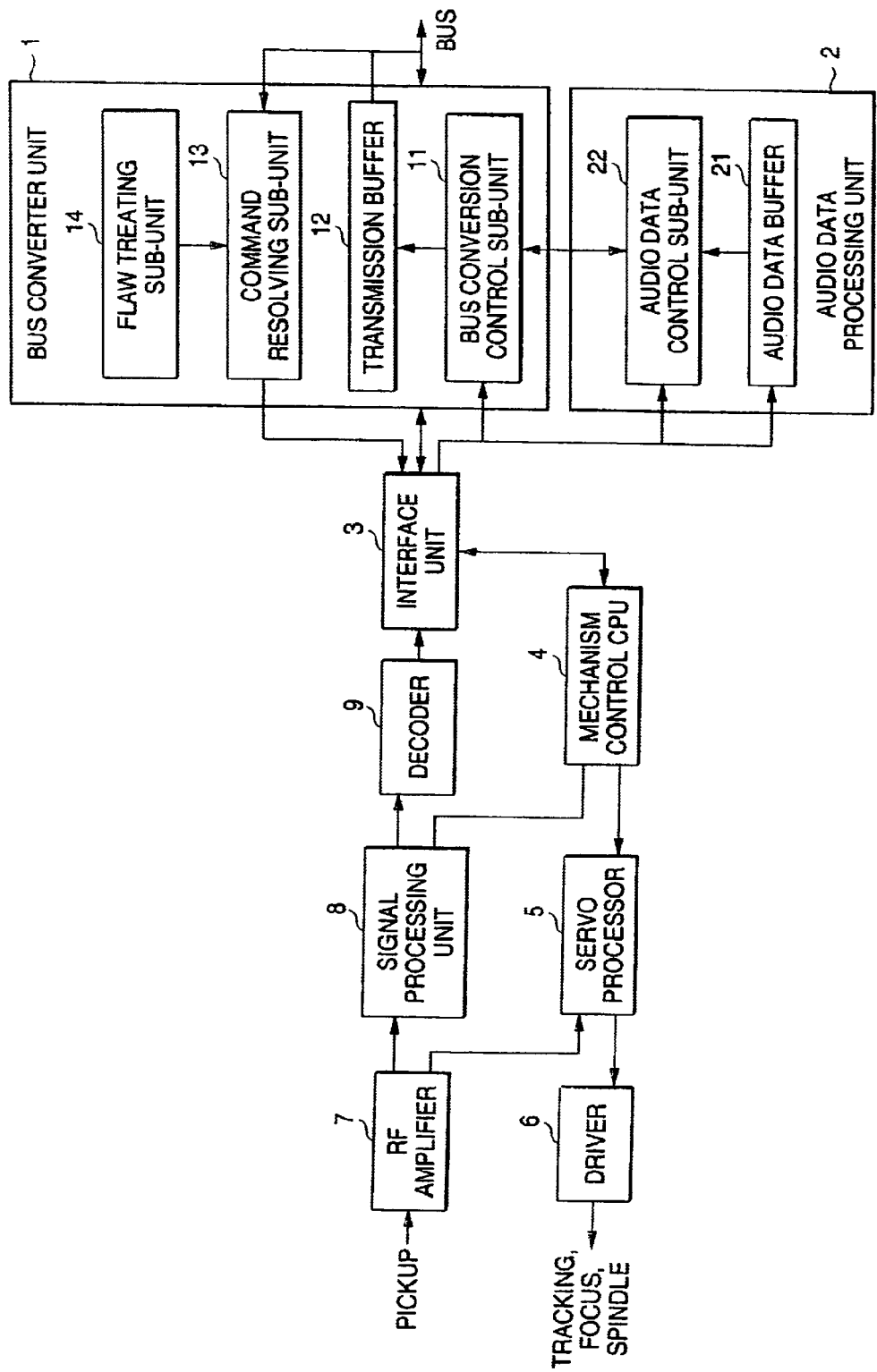
FIG. 6 is a functional block diagram showing the general configuration of an automotive audio system according to the third embodiment of the invention.

The third embodiment of the invention is essentially the same as the second invention, except that a flaw treating sub-unit 14 is added to the bus converter unit 1 as shown in FIG. 6 so that an error can be appropriately corrected if it develops during the reading of sound signal. Thus, in the third embodiment, errors in data reading are corrected by the bus converter unit 1; even if an error in the reading of sound signal occurs due, for example, to a flaw in the medium or its vibration, its occurrence and the contents of its correction can be recognized in the bus converter unit 1 and the main unit M. As a result, diverse error correction and stable system operation can be accomplished with great ease.

Figure 7:
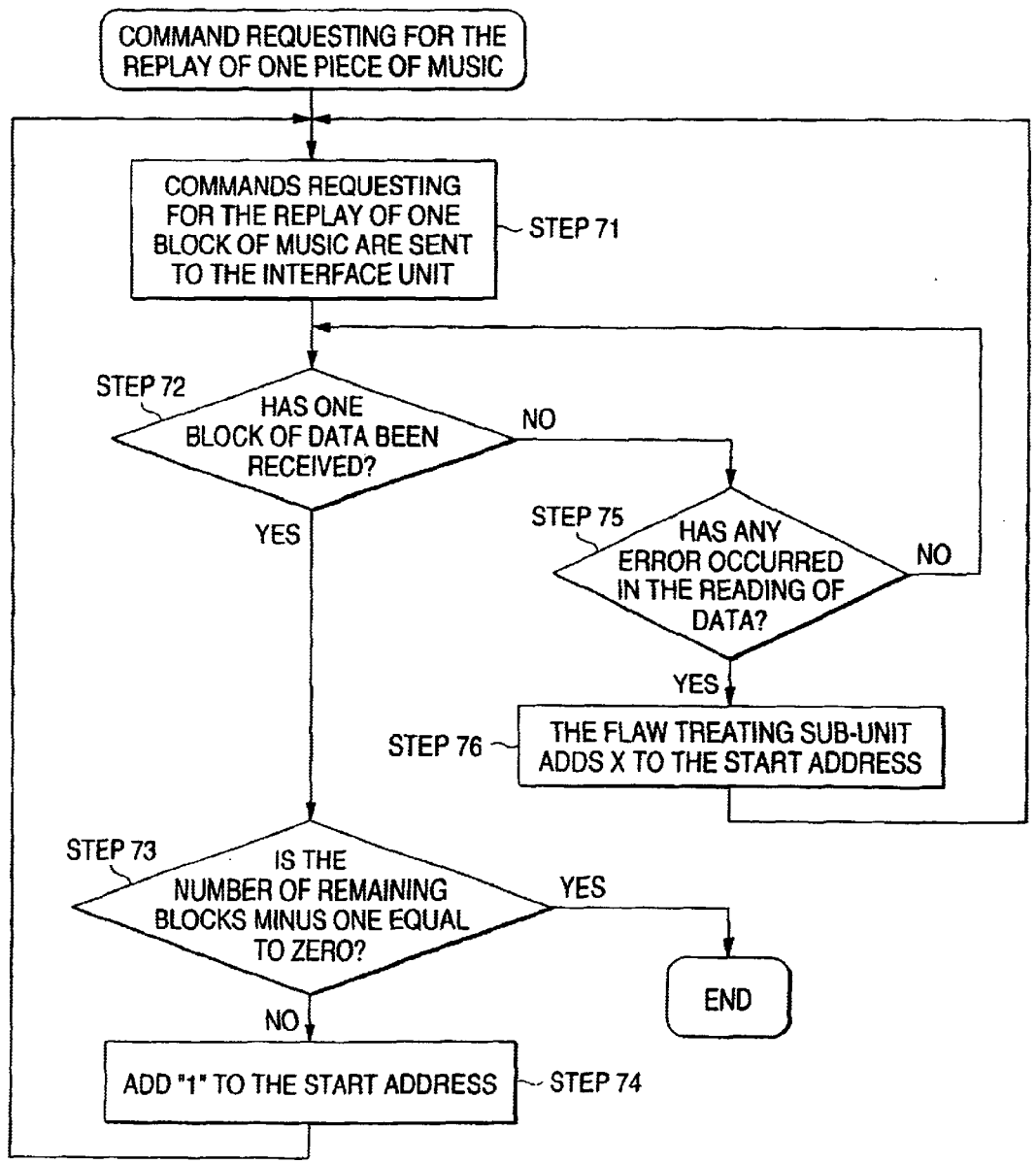
FIG. 7 is a flow chart showing the sequence of steps in processing in the third embodiment of the invention.
Figure 8:
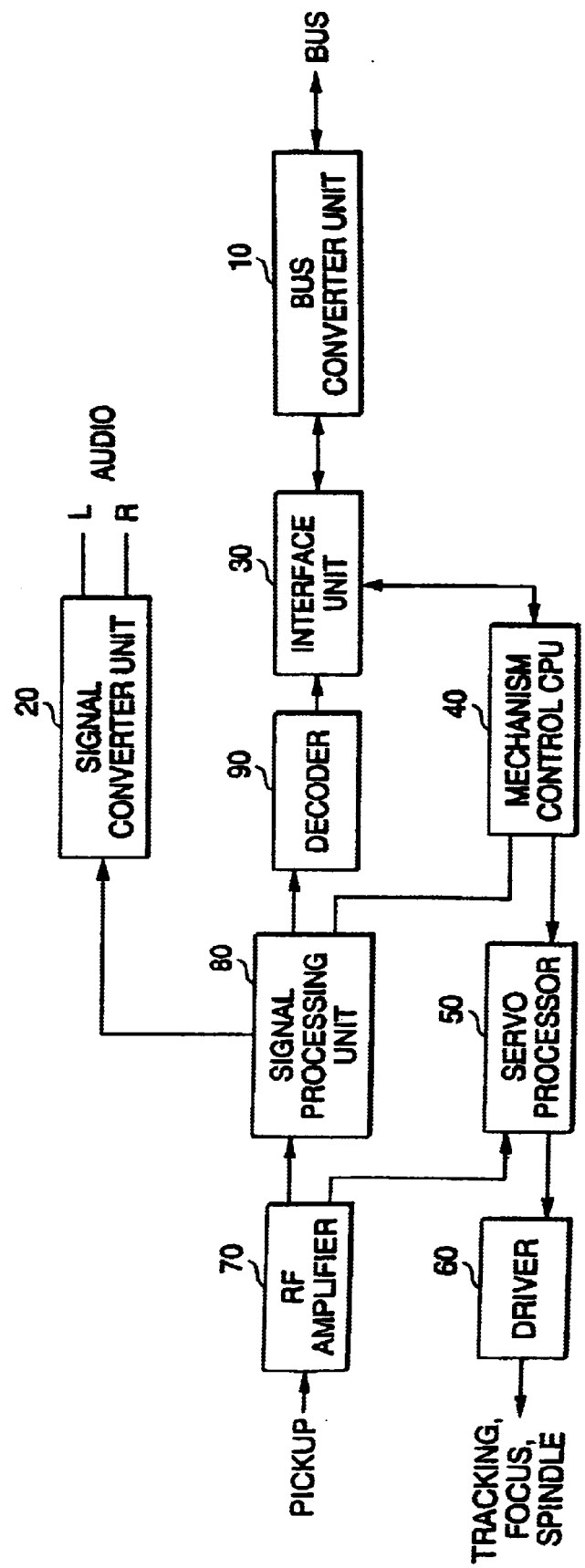
FIG. 8 is a functional block diagram showing the specific configuration of an external device in a prior art automotive audio system.

FIG. 7 shows the specific sequence of steps in an operation using the flaw treating sub-unit 14. Upon receiving a command requesting for the replay of one piece of music from the main unit M, the command resolving sub-unit 13 converts it into a plurality of commands requesting for the replay of one block of music and sequentially transmits the individual commands to the interface unit 3 (step 71).

Suppose here that due to a flaw in the recording medium or its vibration, an error in data reading has occurred in the block of the address requested by the command (step 75). The replay means such as the mechanism control CPU 4 detects this event and notifies it to the interface unit 3 which, in turn, notifies the bus converter unit 1 of the occurrence of the reading error. Receiving this information, the flaw treating sub-unit 14 sets a new start address by adding X blocks, or the appropriate number of blocks that are necessary to correct the error (step 76) and notifies the command resolving sub-unit 13 to send a command requesting that one block of music be reproduced again from the new start address (step 71).

In the third embodiment, error correction can be performed in diverse ways by various components of the system and, in the particular case described above, errors can be corrected by the bus converter unit 1 and this contributes to improve the operational stability of the system, thus leading to particularly great benefits when successive errors occur as in the case of vehicular running on a rough road. If the configuration according to the third embodiment is combined with the command resolving sub-unit 13, the main unit M needs only to send a control signal such as one for replay start or track-up to the external device D, which then executes the necessary steps including designation of a new start address and error correction; as a result, the burden on the main unit M is reduced.

4. Other Embodiments

While three embodiments of the invention have been described above, it should be understood that the configurations and operating steps described in those embodiments are merely illustrative and various other embodiments are possible. To give just a few examples, the first unit may consist of two or more external devices that can be used simultaneously in such a way that one external device transmits digital audio data to the main unit whereas another external device sends an analog sound signal to the main unit as in the prior art.

While the bus B may be of any specific type, a bus such as USB which is capable of connecting a plurality of devices in a daisy chain fashion has the advantage of realizing more straightforward harnessing than a star connection which uses the main unit as a hub. It should also be noted that the automotive audio system of the invention is applicable to all kinds of mobile vehicles including 2-wheeled motor vehicles.

The replay means including various mechanisms, the external device or the first unit including the replay means and the main unit or the second unit may have any specific configurations. For example, the sound signal to be reproduced by the second unit is in no way limited to the one transmitted from the external device and it is possible to reproduce the sound signal supplied from a built-in radio tuner or CD drive in the second unit.

In yet another embodiment, the command sent from the second unit may be resolved or divided into a plurality of segments, or any criteria or formats may be selected when correcting errors.

As described on the foregoing pages, the present invention provides an automotive audio system in which the audio data from an external device is sent to a main unit as it remains in digital form, whereby both audio data and a control signal for controlling the external device are sent over a single common line to simplify the overall system configuration, prevent deterioration of sound quality and facilitating the processing of audio data in the main unit.

What is claimed is:

1. An automotive audio system comprising:
   a first unit for acquiring a sound signal to be reproduced;
   a second unit for controlling said first unit by a control signal and also reproducing the supplied sound signal; and
   a bus for establishing communication between said first unit and said second unit, wherein the control signal and the sound signal in digital format are transferred between said first unit and said second unit via said bus.

2. The automotive audio system according to claim 1, wherein said first unit comprises:
   a bus converter means for controlling the transfer of signals via said bus; and
   a control means for transferring the sound signal via said bus.

3. An automotive audio system comprising:
   a first unit for acquiring a sound signal to be reproduced;
   a second unit for controlling said first unit by a control signal and also reproducing the supplied sound signal; and
   a bus for establishing communication between said first unit and said second unit, wherein the control signal and the sound signal in digital format are transferred between said first unit and said second unit via said bus,
   wherein said first unit comprises:
   a playback means for reading a sound signal from a recording medium, and
   said bus converter means comprises:
   a command resolving means for sending a command for reading predetermined volume of sound signal from a designated address on the recording medium to said playback means at predetermined time intervals in accordance with the contents of the supplied control signal.

4. The automotive audio system according to claim 1, wherein said bus converter means comprises:
   means for correcting any error that occurs in the reading of the sound signal.

5. A method of controlling an automotive audio system comprising:
   acquiring a sound signal to be reproduced by a first unit;
   controlling said first unit by a control signal and also reproducing the supplied sound signal by a second unit; and
   establishing communication between said first unit and said second unit by a bus,
   wherein the control signal and the sound signal in digital format are transferred between said first unit and said second unit via said bus.

6. The method according to claim 5, further comprising:
   controlling the transfer of signals via said bus in said first unit; and
   transferring the sound signal via said bus in said first unit.

7. A method of controlling an automotive audio system comprising:
   acquiring a sound signal to be reproduced by a first unit;
   controlling said first unit by a control signal and also reproducing the supplied sound signal by a second unit; and establishing communication between said first unit and said second unit by a bus, wherein the control signal and the sound signal in digital format are transferred between said first unit and said second unit via said bus, further comprising:

the step of sending a command for reading a predetermined volume of sound signal from a designated address on the recording medium to said playback means at predetermined time intervals in accordance with the contents of the supplied control signal, wherein said first unit comprises a playback means for reading a sound signal from a recording medium.

8. The method according to claim 5, further comprising:

correcting any error that occurs in the reading of the sound signal in said second unit.

9. An automotive audio system comprising:

a bus;

a sound signal acquisition unit that transmits a digital sound signal to the bus;

a control unit that receives the digital sound signal from the bus and transmits a digital control signal via the bus to the sound signal acquisition unit.

10. The system of claim 9, wherein said control unit reproduces the digital sound signal.

11. The system of claim 9, wherein said sound signal acquisition unit comprises:

a bus converter that controls communications via the bus; and a bus controller that transmits the digital sound signal to the bus.

12. The system of claim 9, wherein said sound signal acquisition unit comprises a playback unit that reads the digital sound signal from a recording medium.

13. The system of claim 12, wherein said bus converter comprises a command resolver that sends a read command for reading a predetermined volume signal from the recording medium to the playback unit.

14. The system of claim 13, wherein said command resolver sends the read command to the playback unit at predetermined time intervals based upon the digital control signal.

15. The system of claim 13, wherein the read command designates an address on the recording medium.

16. The system of claim 11, wherein said bus converter comprises a read error correction unit that corrects an error in the reading of the digital sound signal.

17. A method of controlling an automotive audio system comprising:

transmitting a digital sound signal from a sound signal acquisition unit to a control unit via a bus; and transmitting a digital control signal from the control unit to the sound signal acquisition unit via the bus.

18. The method of claim 17, further comprising:

controlling the sound signal acquisition unit based upon the digital control signal; and reproducing the digital sound signal using the control unit.

19. The method of claim 17, wherein said digital command signal comprises a read command for reading a predetermined volume signal from a designated address on a recording medium, and wherein the method further comprises forwarding the read command to a playback unit in the sound signal acquisition unit; and reading said digital sound signal from said recording medium using the playback unit.

20. The method of claim 17, further comprising correcting an error during a reading of the digital sound signal from a recording medium.

* * * * *